United States Patent [19]

Lee et al.

[11] 4,287,464

[45] Sep. 1, 1981

[54] POWER FACTOR CONTROLLER FOR AN INDUCTION MOTOR USING TRANSISTOR SWITCH MEANS WITH VARIABLE BREAKDOWN VOLTAGE

[75] Inventors: Maw H. Lee, Broadview Heights; John E. Keim, Lodi, Both of Ohio

[73] Assignee: The Scott & Fetzer Company, Cleveland, Ohio

[21] Appl. No.: 104,700

[22] Filed: Dec. 17, 1979

[51] Int. Cl.³ .......................... H02P 7/36; H02P 7/58
[52] U.S. Cl. .................................... 318/805; 318/798; 318/809
[58] Field of Search ............... 318/729, 798, 805, 806, 318/809, 812

[56] References Cited

U.S. PATENT DOCUMENTS

| | | | |
|---|---|---|---|
| 3,441,823 | 4/1969 | Schlabach | 318/809 X |
| 3,443,188 | 5/1969 | Mortimer | 318/809 X |
| 4,052,648 | 9/1977 | Nola | 318/812 X |
| 4,110,671 | 8/1978 | Roger | 318/798 |
| 4,176,307 | 11/1979 | Parker | 318/812 |
| 4,190,793 | 2/1980 | Parker et al. | 318/812 X |

Primary Examiner—Stanley J. Witkowski
Assistant Examiner—Richard M. Moose
Attorney, Agent, or Firm—Pearne, Gordon, Sessions, McCoy & Granger

[57] ABSTRACT

A phase-triggered, gate-controlled AC semiconductor switch of the thyrister type in series with an induction motor and its AC supply, optimizes power flow to the motor under changing mechanical load conditions by varying the amount of supply voltage applied to the motor over each half-cycle of the AC supply. The triggering point of the semiconductor switch relative to the preceding zero crossing point of the supply voltage, that is, the switch firing angle or delay angle, is varied as a function of mechanical loading on the motor by means of a load current induced feedback voltage which varies the breakdown or triggering voltage of a two-transistor switch functioning as a variable trigger diode between the gate of the semiconductor switch and a turn-on capacitor charged by the AC supply voltage during non-conducting periods of the semiconductor switch. Under increasing mechanical load conditions, the feedback voltage increases in proportion to increasing load current, the increasing feedback voltage lowering the breakdown voltage of the two-transistor switch to trigger the semiconductor switch into conduction at a reduced firing angle, wherein power flow to the motor is increased. Conversely, under decreasing mechanical load conditions, the feedback voltage decreases in proportion to decreasing load current, the decreasing feedback voltage raising the breakdown voltage of the two-transistor switch to trigger the semiconductor switch into conduction at an increased firing angle, wherein losses caused by reactive current in the less-than-fully-loaded induction motor are reduced with a resultant optimization of power factor.

6 Claims, 2 Drawing Figures

POWER FACTOR CONTROLLER FOR AN INDUCTION MOTOR USING TRANSISTOR SWITCH MEANS WITH VARIABLE BREAKDOWN VOLTAGE

BACKGROUND OF INVENTION

The present invention relates to electronic controllers for motors adapted to drive varying or less than full mechanical loads, and more particularly, to control circuits for automatically reducing the power applied to a less-than-fully-loaded AC induction motor, such reduced power application reducing losses caused by reactive current to improve the power factor of the induction motor.

U.S. Pat. No. 4,052,648 to Nola discloses an AC induction motor control circuit of the subject type which utilizes a Triac switch (TRIAC is a trademark of The General Electric Company of Syracuse, New York) in series with an induction motor to lessen the time of supply voltage application to the motor, on a half-cycle basis, the time of supply voltage application being inversely proportional to the power factor (greater current lag; lessening mechanical load) which is sensed by load voltage and load current sampling. In effect, Nola continuously senses the phase angle between the load voltage and load current, and then uses a phase angle-related signal to continuously adjust the firing point of the Triac switch relative to the zero crossing point of the line voltage. For a sensed increasing phase angle (decreasing power factor) between load voltage and load current, Nola shifts the Triac firing point away from the line voltage zero crossing point to apply a smaller portion of each half-cycle of the line voltage, which inherently decreases the phase angle (increasing power factor) and reduces the heat loss ($I^2R$) caused by the reactive current.

While Nola recognizes the energy-saving advantages of duty cycle controlling an induction motor as a function of load with a series-inserted, phase-triggered Triac switch, his phase angle measuring requirement and the resultant circuitry are undesirably complex and costly as compared to the relative simplicity and low cost of a small, single phase induction motor which exhibits the greatest need for reliable power factor regulation.

U.S. application Ser. No. 042,608, filed May 25, 1979, by the inventor in the present application discloses an electronic controller which senses load current only in providing effective power factor control of an induction motor. While this current sensing only controller represents a substantial improvement over the earlier-discussed Nola device, it still requires a considerable number of components, resulting in costs which detract from its advantages in some applications.

SUMMARY OF THE INVENTION

An electronic controller for regulating power applied by an AC supply to an AC induction motor includes a gate-controlled semiconductor AC switching means connected in electrical series relationship with the AC supply and the induction motor, power being applied to the motor via the AC switching means.

A means for detecting alternating direction load current pulses through the motor when the AC switching means is in a conducting state is provided. The means for detecting includes a resistor means in series with the motor, the resistor means providing a proportional voltage pulse for each load current pulse.

An RC network is provided and includes a capacitor charging in alternating voltage polarities from the application of AC supply voltage when the semiconductor switch is in a non-conducting condition.

A full wave rectifier means converts at least a portion of the alternating polarity AC voltage across the capacitor to a single polarity DC voltage.

A unidirectional current transistor switch means configured to function as a trigger diode having a variable breakdown voltage is connected to drive the gate electrode of the AC semiconductor switching means. The DC voltage is supplied by the capacitor to the transistor switch via the rectifier means. The transistor switch means switches to a fully conducting condition at a breakdown voltage attained by the charging capacitor wherein turn-on current is applied to the gate electrode of the semiconductor switch to trigger it into a conducting state, the semiconductor switching means switching to a non-conducting state generally at the trailing edge of each load current pulse when the turn-on current is not applied to the gate electrode of the semiconductor switching means.

In accordance with the present invention, a control means, responsive to the proportional voltage pulses provided by the resistor means, is connected to the transistor switch to vary its breakdown voltage in accordance with the amplitude of the proportional voltage pulses. An increase in the amplitude of the proportional voltage pulses causes, via the control means, a decrease in the breakdown voltage of the transistor switch means. A decrease in the amplitude of the proportional voltage pulses causes, via the control means, an increase in the breakdown voltage of the transistor switch means.

Such a circuit configuration in accordance with the present invention has been found to significantly reduce losses caused by reactive current in the less-than-fully-loaded induction motor wherein power factor of the motor is optimized.

BRIEF DESCRIPTION OF THE DRAWING

Other objects and a fuller understanding of the invention may be had by referring to the following description and claims, taken in conjunction with the accompanying drawing.

DETAILED DESCRIPTION OF THE PREFERRED EMBODIMENT

Figure 1:
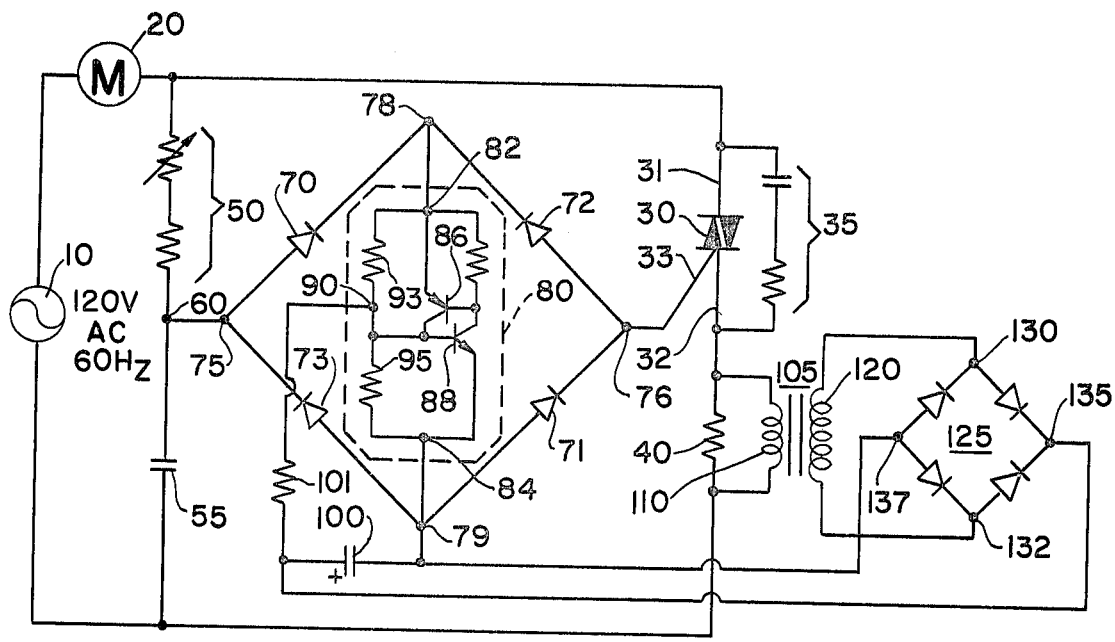
FIG. 1 is a detailed schematic diagram of a circuit embodiment in accordance with the present invention.
Figure 2:
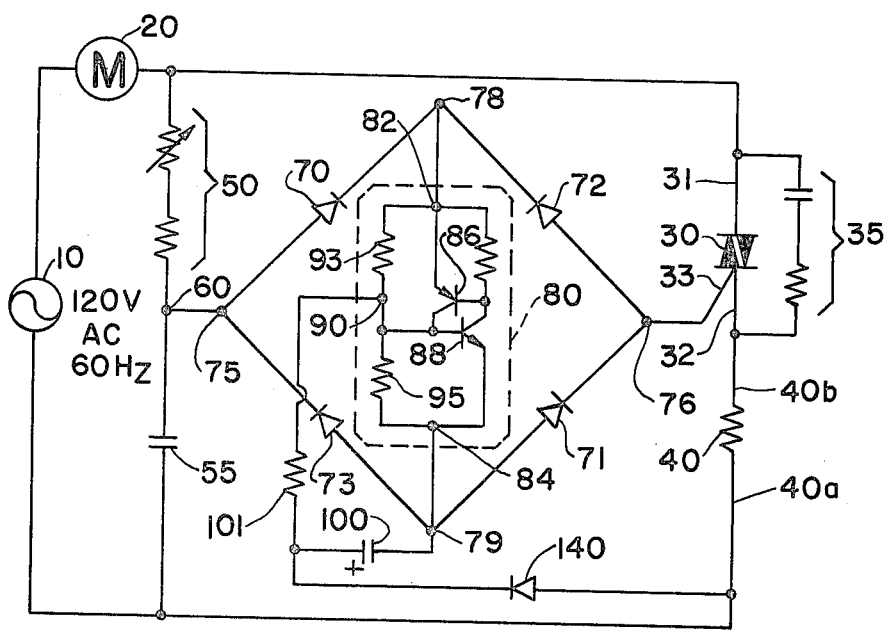
FIG. 2 is a detailed schematic diagram of another circuit embodiment in accordance with the present invention.

With reference to FIGS. 1 and 2, there are illustrated, in accordance with the present invention, two preferred embodiments of an electronic controller for regulating power applied by an AC supply to an AC induction motor. In describing these two embodiments, like reference numerals have been used to designate common elements which function in a generally identical manner.

An alternating current or AC current single-phase supply 10, typically of 120 volts, 60-hertz, provides power to a conventional single-phase induction motor 20, load current to the motor 20 being regulated by a gate-controlled semiconductor AC switching means 30 of the thyristor type, illustrated in the preferred embodiment as a Triac switch.

Means for detecting alternating direction load current pulses through the motor includes a sampling resistor 40. It can be seen that substantially all load current flow is through the series-connected supply 10, induction motor 20, semiconductor switching means 30, and load current sampling resistor 40. With the semiconductor switching means 30 in a fully conducting condition, load current pulses flow back and forth in alternating directions through the load current sampling resistor 40 to provide proportional alternating polarity voltage pulses across it. Typically, the current sampling resistor is of very low value, on the order of 0.01 ohms, to ensure substantially full application of AC supply voltage across the induction motor 20.

The semiconductor switching means 30, in the preferred form of a Triac, includes a pair of power leads 31, 32 and a gate electrode 33, the application of appropriate turn-on current into or out of the gate electrode 33 causing the switching means 30 to trigger into a fully conducting condition, such fully conducting condition being maintained until the current through the semiconductor switching means 30 via the power leads 31,32 is reduced below a minimum holding current wherein the semiconductor switching means 30 recovers to a non-conducting condition. Such thyristor-type semiconductor switch characteristics are well known in the art, and need not be explained in detail.

To ensure proper commutation of the semiconductor switching means 30, a conventional RC snubber network (dv/dt suppression) is provided in parallel across the semiconductor switching means 30, as illustrated.

It is known in the art that power to the motor 20 can be regulated by firing the semiconductor switching means 30 into a conducting condition a predetermined time period after the preceding zero crossing point of the supply voltage wherein less than a full half-cycle of the line voltage is applied to the motor, such reduced application decreasing the amount of power applied to the motor. By regulating the switch firing angle, i.e., the time delay period between the zero crossing point of the line voltage and the turn-on point of the semiconductor switching means 30, as a function of mechanical loading on the motor 20, more or less power can be provided to the motor 20 to optimize its power factor. Such a control scheme is known in the art as represented by the earlier-noted U.S. Pat. No. 4,052,648 to Nola.

Means for providing appropriate turn-on current to the semiconductor switching means 30 to effect power regulation of the motor 20 to optimize its power factor will now be discussed.

A trigger current supplying network, including a pair of resistors 50 in series with a turn-on capacitor 55, is provided and illustrated as being parallel-connected across the series-connected AC supply 10 and motor 20. It can be seen that with the semiconductor switching means 30 in a non-conducting condition, the supply voltage is applied across the series-connected resistors 50 and capacitor 55 wherein the capacitor 55 will charge in alternating direction polarities, depending upon the polarity condition of the AC supply. An interconnection junction 60 provided between the resistors 50 and the capacitor 55 presents a rising triggering voltage of appropriate polarity in general synchronism with the leading edges of the alternating current pulses provided by the AC supply 10.

A full-wave rectifier means having bridge rectifier diodes 70, 71, 72, and 73 provides a pair of AC input terminals 75 and 76, a DC output terminal 78, and a DC return terminal 79. One of the AC input terminals 75 is connected to the interconnection junction 60, while the other AC input terminal 76 is connected to the gate electrode 33. It can be seen that the full-wave rectifier means converts at least a portion of the alternating polarity AC voltage across the capacitor 55 to a single polarity DC voltage provided at the DC output terminal 78.

A unidirectional current transistor switch means 80 in the illustrated preferred form of a two-transistor (86, 88), regenerative action switch, configured to function as a trigger diode having a variable breakdown voltage, is connected between the DC output terminal 78 and the DC return terminal 79, the transistor switch means 80 providing a current input terminal 82 and a current output terminal 84. The configuration and operation of the transistor switch means 80 is well known in the art. It establishes a high impedance, current blocking state between terminals 82 and 84 until the voltage across such terminals reaches a predetermined point wherein the transistors 86, 88, by regenerative switching action, quickly saturate or break down to provide a low impedance current-passing state between the terminals 82 and 84. Upon a predetermined decrease in the voltage across terminals 82, 84, the transistor switch means 80 recovers to its non-conducting, high impedance, current-blocking state. The breakdown voltage at which the switch means 80 turns on and saturates is determined primarily by a pair of breakdown voltage determining resistors 93 and 95 and a control voltage input at an interconnection junction 90, to be subsequently discussed.

The operation of the circuit of FIGS. 1 and 2, as illustrated to this point, will now be discussed. With the AC supply voltage at its zero crossing point, the semiconductor switching means 30 is in a non-conducting condition and the capacitor 55 is substantially fully discharged. Upon initiation of, for example, a positive polarity swing of the AC supply 10, transistor switch 80 maintains its non-conducting, high impedance current blocking state to preclude the application of turn-on current at the gate electrode 33 wherein the switching means 30 remains in a non-conducting condition. As the positive polarity supply voltage builds, the capacitor 55 charges at an RC time constant in accordance with the combination of resistors 50 and capacitor 55, such charging providing an increasing positive voltage at the interconnection junction 60 and necessarily at the AC current input 75 of the full-wave bridge comprised by the diodes 70, 71, 72, and 73.

This positive voltage is applied via diode 70 to the DC output terminal 78, such positive voltage being blocked by the diode 72 to preclude its application to the gate electrode 33. Upon the DC voltage at the output terminal 78 reaching a predetermined breakdown voltage value, the transistor switch means 80 is triggered to its low impedance, current-passing state wherein DC current flows from output terminal 78 to return terminal 79, then through diode 71 to the other AC input terminal 76, and to the gate electrode 33 to turn on switching means 30. Upon the completion of the remaining portion of the positive polarity half-cycle swing of the supply 10, the thyristor-type switch 30 once again turns off at the zero crossing point of the supply voltage.

Upon a negative polarity swing of the AC supply 10, DC voltage is applied to terminal 78 via diode 72 until it reaches the breakdown voltage of the transistor switch 80, wherein current once again flows from DC output terminal 78 to DC return terminal 79, and then through diode 73 back to the capacitor 55.

It can be seen that on alternating half-cycles of the AC supply 10, turn-on current is fed into or pulled out of the gate electrode 33 to effect switching of the semiconductor switching means 30, the amount of half-cycle voltage applied to the motor 20 depending upon the breakdown voltage of the transistor switch means 80.

Operation of the illustrated circuitry of FIGS. 1 and 2 as explained to this point is well known in the art.

In accordance with the present invention, control means, responsive to the porportional voltage pulses provided by the resistor means 40, is connected to the transistor switch means 80 to vary its breakdown voltage in accordance with the amplitude of the proportional voltage pulses. An increase in the amplitude of the proportional voltage pulses causes, via the control means, a decrease in the breakdown voltage of the transistor switch means 80, or a decrease in the amplitude of the proportional voltage pulses causes, via the control means, an increase in the breakdown voltage of the transistor switch means 80.

Since the proportional voltage pulses across the sampling resistor 40 are directly related to the amplitude of the current pulses through the sampling resistor 40, such current amplitude being a function of mechanical loading on the motor 20, it can be seen that effective feedback control is provided to vary the firing angle or the delay angle of the semiconductor switching means 30.

With particular reference to FIG. 1, a step-up transformer 105 having a low voltage primary winding 110 and a higher voltage secondary winding 120 is provided. The primary winding 110 is connected across the current sampling resistor 40 to sense the proportional voltage pulses provided by it, while the secondary winding 120 is connected across the AC input constituted by a pair of AC input terminals 130 and 132 of a full-wave bridge rectifier 125.

In further accordance with the invention, a breakdown voltage adjusting capacitor 100 is connected across the DC output of the full-wave rectifier 125, providing a DC output terminal 135 and a DC return terminal 137. The full-wave rectifier 125 provides, through the adjusting capacitor 10, DC proportional voltage pulses corresponding to each half-cycle of the load current (120 Hz). The proportional DC voltage pulse as provided by the full-wave rectifier 125 varies the charge on the adjusting capacitor 100, the capacitor 100 charging to a DC voltage amplitude proportional to the peak value of the DC proportional voltage pulses. The adjusting capacitor DC voltage is applied to the transistor switch means 80 at the interconnection junction 90 to the resistors 93 and 95 via a current limit resistor 101 to establish the breakdown voltage of the transistor switch 80.

A change in the amplitude of the DC proportional voltage pulses provided by the full-wave rectifier 125 causes a corresponding change in the breakdown voltage of the transistor switch means 80. For a decreasing mechanical load on the motor 20, the current pulses through the sampling resistor 40 decrease, and a corresponding decrease in the resistor-generated proportional voltage pulse is provided to the primary winding 110 of the transformer 105. The stepped-up voltage across the secondary winding 120 also decreases proportionally to provide, via the full-wave bridge 125, decreasing amplitude DC voltage pulses to the capacitor 100 to decrease its DC voltage which is applied to the interconnection junction 90, such application causing the breakdown voltage of the switch 80 to increase, wherein a higher DC voltage is required at terminal 78 to switch the transistor switch 80 into its low impedance, current-passing state to effect the application of turn-on current to the gate electrode 33. Thus, the firing angle or delay angle, i.e., the time period between the zero crossing point of the line voltage and the triggering point of the semiconductor switch 30 is increased. Such increase reduces the power application to the induction motor to maintain its power factor at an acceptable level, i.e., less power is applied as the motor becomes less loaded.

Conversely, an increase in loading on the motor causes an amplitude increase in load current pulses through the sampling resistor 40, with a corresponding increase in the DC voltage level on the adjusting capacitor 100, such increasing voltage being applied at interconnection junction 90 to lower the breakdown voltage of the transistor switch means 80, such increased voltage application reducing the firing angle of the semiconductor switching means 30 to effect the application of increased power to the motor 20. Such a feedback control scheme, as illustrated in FIG. 1, provides for very rapid adjustment (every ½ hertz) of power application to the motor 20 as its mechanical load is varied.

Turning to FIG. 2, the control means includes the adjusting capacitor 100 and the current limiting resistor 101 functioning in a generally identical manner, as noted earlier with regard to FIG. 1. However, in the circuit of FIG. 2, a half-wave rectifier diode 140 provides half-wave rectified DC voltage pulses to the adjusting capacitor 100 corresponding to alternating half-cycles of the load current (60 Hz). The operation of the circuit of FIG. 2 is generally identical with that as illustrated in FIG. 1, except that the response of FIG. 2 is slower, i.e., every other half-hertz. In a preferred form, one end 40b of the resistor 40 is connected directly to the induction motor and the other end 40a of the resistor 40 is directly connected to one side of the AC supply and the anode terminal of the diode 140, the cathode terminal of the diode being directly connected to the adjusting capacitor 100, as illustrated.

The present invention has been found to provide a very low cost circuit to effect improved power factor control of an induction motor.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An electronic controller for regulating power applied by an AC supply to an AC induction motor comprising:
   a gate-controlled semiconductor AC switching means connected in electrical series relationship with the AC supply and the induction motor, power being applied to the motor via the AC switching means;

means for detecting alternating direction load current pulses through the motor when the AC switching means is in a conducting state, the means for detecting including a resistor means in series with the motor, the resistor means providing a proportional voltage pulse for each load current pulse;

an RC network including a capacitor charging in alternating voltage polarities from the application of AC supply voltage when the semiconductor switch is in a non-conducting condition;

full wave rectifier means for converting at least a portion of the alternating polarity AC voltage across the capacitor to a single polarity DC voltage;

a unidirectional current transistor switch means configured to function as a trigger diode having a variable breakdown voltage, the transistor switch means being connected to drive the gate electrode of the AC semiconductor switching means, the DC voltage being supplied by the capacitor to the transistor switch means via the rectifier means, the transistor switch means switching to a fully conducting condition at a breakdown voltage attained by the charging capacitor, wherein turn-on current is applied to the gate electrode of the semiconductor switch to trigger it into a conducting condition, the semiconductor switching means switching to a non-conducting state generally at the trailing edge of each load current pulse when the turn-on current is not applied to the gate electrode of the semiconductor switching means; and control means responsive to the proportional voltage pulses provided by the resistor means, the control means being connected to the transistor switch means to vary its breakdown voltage in accordance with the amplitude of the proportional voltage pulses, an increase in the amplitude of the proportional voltage pulses causing, via the control means, a decrease in the breakdown voltage of the transistor switch means, a decrease in the amplitude of the proportional voltage pulses causing, via the control means, an increase in the breakdown voltage of the transistor switch means.

2. An electronic controller according to claim 1, wherein the control means includes a half-wave rectifier diode having one end connected to an end of the sampling resistor and a breakdown voltage adjusting capacitor connected to the other end of the diode, the half-wave rectifier providing to the adjusting capacitor rectified DC proportional voltage pulses corresponding to alternating half-cycles of the load current, the proportional DC voltage pulses provided by the diode charging the adjusting capacitor to a DC voltage amplitude proportional to the peak value of the proportional voltage pulses, the adjusting capacitor DC voltage being applied to the transistor switch means to establish its breakdown voltage, a change in the amplitude of the proportional voltage pulses provided by the diode causing a corresponding change in the breakdown voltage of the transistor switch means.

3. An electronic controller according to claim 2, wherein one end of the resistor means is connected directly to the induction motor and the other end of the resistor means is connected directly to the AC supply and the anode terminal of the diode, the cathode terminal of the diode being directly connected to the adjusting capacitor.

4. An electronic controller according to claim 1, wherein the control means includes a step-up transformer having a low voltage primary winding and a higher voltage secondary winding, a full-wave rectifier having an AC input and a DC output, and a breakdown voltage adjusting capacitor, the primary winding being connected across the resistor means to sense the proportional voltage pulses provided by the resistor means, the secondary winding being connected to the AC input of the full-wave rectifier, the adjusting capacitor being connected to the DC output of the full-wave rectifier providing higher proportional voltage pulses in response to the proportional voltage pulse across the primary winding, the full-wave rectifier providing to the adjusting capacitor rectifier DC proportional voltage pulses corresponding to each half-cycle of the load current, the proportional DC voltage pulses provided by the full-wave rectifier changing the adjusting capacitor to a DC voltage amplitude proportional to the peak value of the DC proportional voltage pulses, the adjusting capacitor DC voltage being applied to the transistor switch means to establish its breakdown voltage, a change in the amplitude of the proportional voltage pulses provided by the full-wave rectifier causing a corresponding change in the breakdown voltage of the transistor switch means.

5. An electronic controller according to claim 4, wherein the full-wave rectifier is a four-diode bridge having a pair of AC input terminals and a pair of DC terminals providing a DC output terminal and a DC return terminal, the secondary winding of the transformer being connected across the pair of AC input terminals, the adjusting capacitor being connected across the pair of DC terminals.

6. An electronic controller according to claim 4, wherein the DC output terminal of the bridge is connected to one end of the adjusting capacitor, that end of the adjusting capacitor being connected to the transistor switch.

* * * * *